Oct. 3, 1961
L. E. SEKULSKI
3,002,792
ROLLER CONVEYER STRUCTURE
Filed Nov. 20, 1958
2 Sheets-Sheet 1
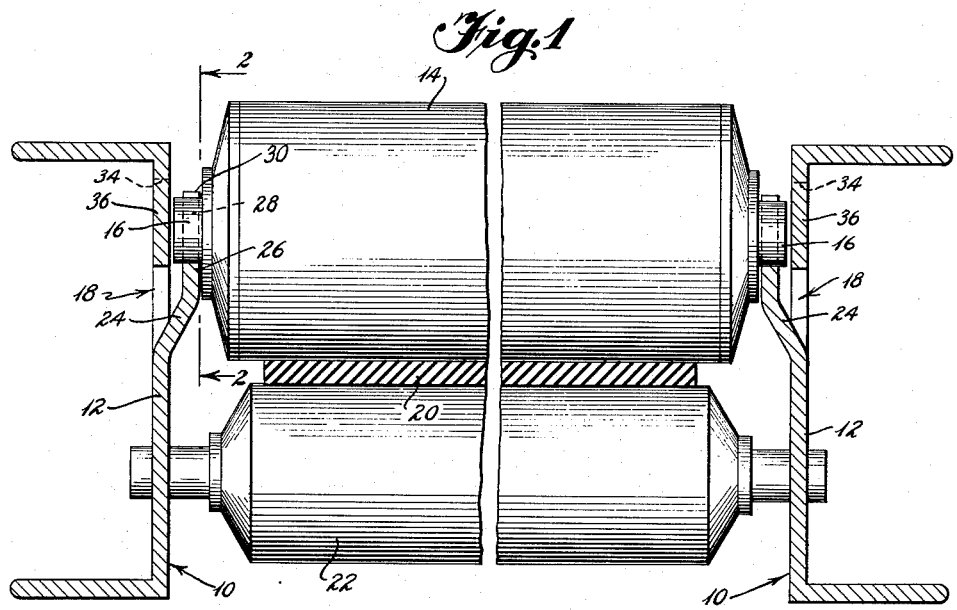
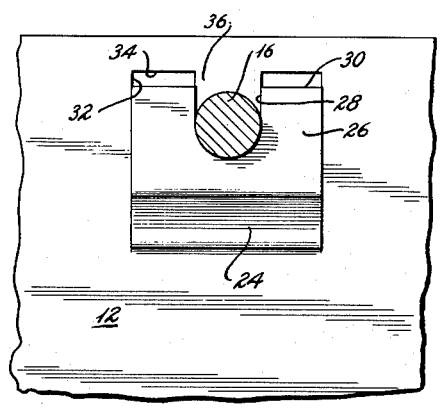
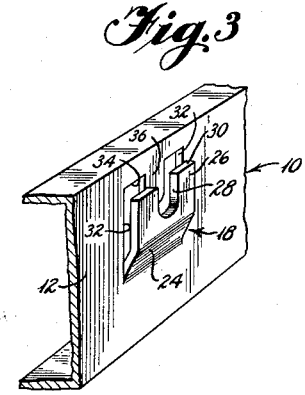
INVENTOR
Lee E. Sekulski
BY
Mead, Browne, Schuyler & Beveridge
ATTORNEYS

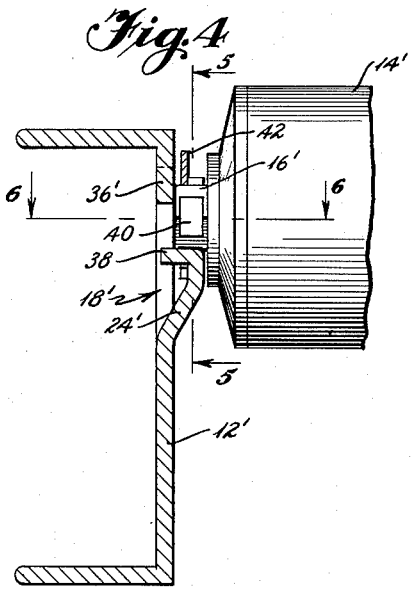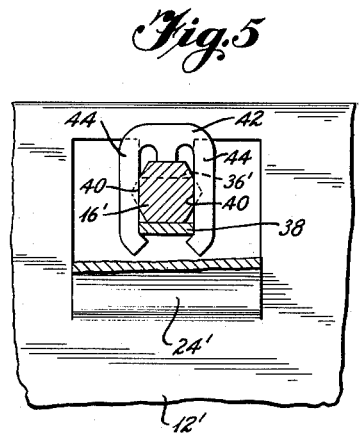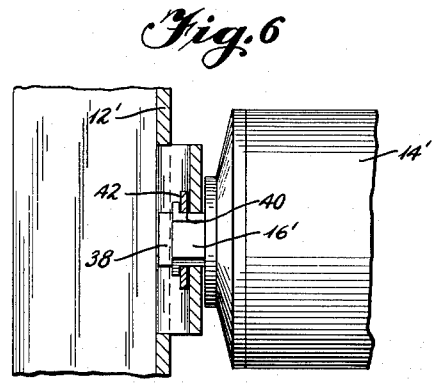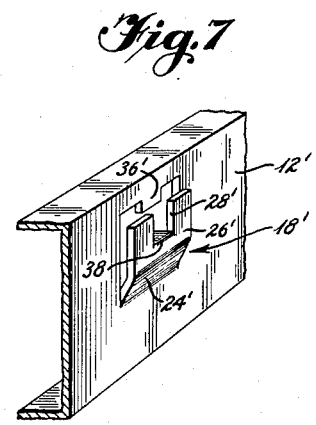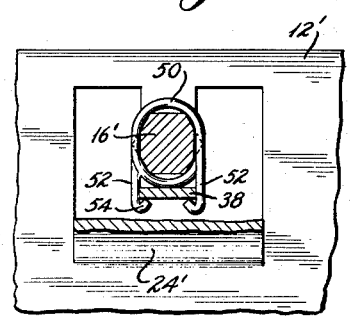

United States Patent Office 3,002,792
Patented Oct. 3, 1961

3,002,792
ROLLER CONVEYER STRUCTURE
Lee E. Sekulski, Ellwood City, Pa., assignor to Mathews Conveyer Company, Ellwood City, Pa., a corporation of Pennsylvania
Filed Nov. 20, 1958, Ser. No. 775,309
4 Claims. (Cl. 308—20)

This invention relates to roller conveyer structure, and more particularly to structural arrangements for supporting conveyer rollers upon the side frame members of the conveyer assembly.

Roller conveyers are generally constructed with a frame which includes a pair of spaced parallel side rails, usually of channel section, between which the rollers are supported. In the usual case, the roller includes an axle which projects beyond opposite ends of the roller and is rotatably mounted within the roller by suitable bearings. The projecting ends of the axle are conventionally supported within openings or brackets located on the respective side rails.

Roller conveyers may be divided into two broad classes—one class including conveyers in which the conveying rollers are power driven as by a driven belt engaging the undersurface of the rollers; the other class consisting of gravity conveyers in which the rollers merely define a substantially frictionless surface upon which articles are conveyed by gravity.

In powered roller conveyers, it is common practice to provide a mounting structure for the roller axles in the form of an upwardly opening notch so that in the event of a jam on the conveyer, as in the case of an article attempting to pass between the roller and the belt, the rollers are free to move upwardly away from the belt, thus reducing the possibility of damage to the conveyer or injury to personnel.

In the case of gravity conveyers, the structure for supporting the roller axle upon the side rail is of a more permanent nature, since such conveyers are frequently portable and always operatively positioned with the side rails tilted downwardly. Because of the more or less permanent connection desired between the roller axle and side rail in the gravity conveyer, the mounting structures employed are such as to require manual assembly with the attendant increased time and manufacturing cost problems.

It is a primary object of the invention to provide an improved support saddle for supporting conveyer roller axles upon a side rail which is equally adaptable for use in power roller conveyers or gravity conveyers.

Another object of the invention is to provide a support saddle for supporting a conveyer roller axle upon a side rail which may be formed as an integral portion of the rail structure in a single manufacturing operation.

In the achievement of the foregoing and other objects, a support saddle embodying the present invention is formed as an integral portion of the side rail by a die operation on the vertical web of the rail. The saddle is formed by cutting through the web on three sides of a four-sided opening, the saddle itself being integral with the web on the fourth side of the opening and formed to project inwardly and upwardly from the lower edge of the opening. The saddle is formed with an upwardly opening notch which is constructed to receive the end of the conveying roller axle. The material which originally filled the notch remains integral with the web and forms a downwardly projecting tab located in alignment with the notch which acts as an abutment on the web limiting movement of the axle through the opening created in the web by the formation of the saddle. In cases where axles of round cross-section are employed, the bottom of the notch is formed in a semi-circular curve. Where hexagonal axles are employed, a tab is left integral with the saddle at the bottom of the notch and is bent toward the opening to form a horizontal seat for the lowermost surface of the hexagonal axle. This seating tab has a length equal to approximately one-half the height of the notch, hence as in the previous case, an integral downwardly projecting tab remains on the web in alignment with the axle to limit movement of the axle toward or through the opening.

The saddle thus formed is complete insofar as its employment in a powered roller conveyer is concerned. In gravity conveyer systems, the roller axle is constructed with a pair of diametrically opposed transverse slots located to receive opposite legs of a spring clip which may be hooked beneath the seating tab to retain the axle upon the seating tab. The grip or retaining force exerted on the axle by such a spring clip is proportional to its resilient properties, hence in some powered roller environments it may be desirable to employ such a spring clip which retains the roller in place during normal usage, but is resilient enough to permit the roller to be released in the case of a jam.

Other objects and advantages of the invention will become apparent by reference to the following specification taken in conjunction with the accompanying drawings.

In the drawings:

FIG. 1 is a transverse cross-sectional view through a roller conveyor embodying the present invention;

FIG. 2 is a cross-sectional view of the structure of FIG. 1 taken on line 2—2 of FIG. 1;

FIG. 3 is a perspective view of a portion of the side rail of the structure of FIG. 1 showing details of the axle supporting saddle;

FIG. 4 is a partial transverse cross-sectional view of a roller conveyer showing an alternative form of saddle;

FIG. 5 is a cross-sectional view through the structure of FIG. 4 taken on the line 5—5 of FIG. 4;

FIG. 6 is a cross-sectional view of the structure of FIG. 4 taken on the line 6—6 of FIG. 4;

FIG. 7 is a perspective view, similar to FIG. 3, but showing the modified form of saddle of FIGS. 4 through 6; and FIG. 8 is a view similar to FIG. 5 showing a modified form of spring-clip.

In FIG. 1, a powered roller conveyer embodying the present invention is shown as including a pair of spaced like side rails 10 of channel shaped cross-section each including an inwardly facing vertical web 12. Side rails 10 are fixedly supported on conventional frame structure, not shown. Articles to be conveyed are supported upon the upper surfaces of a plurality of conveying or carrier rollers 14 which are each rotatably supported upon an axle 16 which projects from each end of roller 14. Axle 16 is supported at each end upon a saddle 18 to be described in greater detail below. Carrier rollers 14 are driven in rotation by means of a powered belt 20 which is driven in movement by conventional structure, not shown. Belt 20 is maintained in frictional engagement with the lower surface of carrier roller 14 by means of pressure rollers 22 which are journaled for rotation within the vertical web 12 of the respective side rails.

The structure of saddle 18 is most clearly shown in FIG. 3. The saddle is integral with web 12 along its lower edge and projects upwardly and outwardly from the web. Preferably, the saddle includes an outwardly and upwardly inclined lower section 24 having a generally vertical upper section 26 projecting upwardly from its upper edge. Upper section 26 is constructed with a central notch 28 which extends downwardly from the upper edge 30 of the saddle. In the embodiment shown in FIGS. 1 through 3, axle 16 of carrier roller 14 is of circular cross-section and the lower end of notch 28 is constructed with a concave curve to receive the circular axle. Saddle 18 is preferably formed with a die and during the formation of the saddle, the die creates an opening in web 12 having spaced vertical edges 32 and an upper edge 34. In forming notch 28, a downwardly projecting tab 36 integral with web 12 and complementary in shape to notch 28 is formed to project downwardly from upper edge 34 in alignment with notch 28. As best seen in FIG. 1, tab 36 forms an abutment located to limit axial movement of axle 16 through the opening in web 12 formed by the construction of saddle 18.

Since notch 28 is open at the top, carrier roller 14 is free to be disengaged from notch 28 should an article being conveyed become jammed between driven belt 20 and carrier roller 14.

A modified form of the saddle is disclosed in FIGS. 4 through 7. In this embodiment, saddle 18' is formed in web 12' by a die in the same manner as the formation of the saddle 18 of FIGS. 1 through 3. Like the previously described saddle 18, saddle 18' includes an outwardly and upwardly inclined lower section 24' integral at its lower end with web 12' and integral at its upper end with a vertical upper section 26'.

A central notch 28' is formed in upper section 26'. As in the previous embodiment, the formation of the saddle 18' creates an opening in web 12' and a downwardly projecting integral tab 36' is created during the formation of notch 28'.

Unlike tab 36, tab 36' does not correspond to the entire notch 28'. Tab 36' projects downwardly from the upper edge of the opening created by the formation of saddle 18' a distance corresponding approximately to one-half of the depth of notch 28'. The material which originally filled the remaining lower portion of notch 28' remains integral with upper section 26' of the saddle and is bent inwardly into a horizontal plane to form a seating tab 38. Seating tab 38 thus forms a flat seat for one surface of hexagonal axle 16'.

Axle 16' is constructed to include a pair of diametrically opposed slots 40 which extend in a direction at right angles to the longitudinal axis of the axle. The depth of the opposed slots 40 is selected to be such that the distance through the axle between the bottom walls of the opposed slots is equal to or slightly less than the width of notch 28'. The axial extent of slots 40 is selected to be slightly greater than the combined thicknesses of upper section 26' and a spring clip fastener 42.

As best seen in FIGS. 5 and 6, fastener 42 is constructed to include a pair of downwardly projecting legs 44 which are seated within slots 40 when axle 16 is positioned upon saddle 18'. Legs 44 are extended downwardly below seating tab 38 and bent inwardly to grip tab 38, thereby providing a resilient coupling which retains axle 16' seated upon seating tab 38. As best seen in FIG. 6, slots 40 also accommodate the opposite side edges of slot 28'.

The structure described above may be employed either on powered roller conveyers or on gravity conveyers by regulating the resilient grip exerted by spring clip 42. In powered roller conveyer environments, the grip exerted by spring clip 42 will be rather loose so that the clip will release from tab 38 in the event that an article becomes jammed between roller 14' and the driving belt. In gravity conveyers, a more forceful grip is desirable and spring clip 42 may be constructed to exert a grip establishing a substantially permanent coupling between axle 16' and seating tab 38.

When employed on gravity conveyers, the construction employing spring clip 42 is extremely convenient from the standpoint of assembling such conveyers. Conventionally, gravity conveyer axles project directly through the webs of their side rails and are usually secured to the rails by means of nuts or other permanent type fastenings. The inwardly located upwardly facing notch 28' of the embodiment of FIGS. 4–7 permits the rollers of the conveyer to be readily dropped into position upon the side rails and the securing of the rollers to the side rails is a simple matter of seating the spring clips 42 at each end of each roller axle.

In FIG. 8, an alternative form of resilient clip is a spring wire fastener 50 which is looped around axle 16' in a continuous loop from which opposite ends 52 of the wire are extended and formed with inwardly projecting end portions 54 located to engage the under surface of seating tab 38.

While I have disclosed exemplary embodiments of my invention, it will be apparent to those skilled in the art that the embodiments disclosed may be modified. Therefore, the foregoing description is to be considered exemplary rather than limiting, and the true scope of my invention is that defined in the following claims.

I claim:

1. In a conveyer assembly including a channel-shaped side rail having a vertical web and a conveying roller having an axle; a laterally offset section on said web having a lower end integral with said web and side and top edges laterally spaced from said web to define an opening therethrough, the upper portion of said section being located in parallel laterally offset relationship to said web, said upper portion of said section having a notch therethrough extending downwardly from said upper edge of said section for receiving and supporting said axle of said conveying roller, and a tab integral with said web and projecting downwardly from the upper edge of said opening in lateral alignment with said notch to prevent movement of said axle through said opening in said web.

2. In a conveyer assembly including a channel-shaped side rail having a vertical web, and a conveying roller having an axle; a laterally offset section on said web having a lower end integral with said web and side and top edges laterally spaced from said web to define an opening therethrough, the upper portion of said section being located in parallel laterally offset relationship to said web, said upper portion of said section having a notch therethrough extending downwardly from said upper edge of said section for receiving and supporting said axle of said conveying roller, an integral tab on said upper portion projecting horizontally from the lower end of said notch toward said opening in supporting engagement with said axle, and means for limiting lateral movement of said axle within said notch.

3. In a conveyer assembly as defined in claim 2, said means for limiting lateral movement of said axle within said notch comprising a tab integral with said web and projecting downwardly from the upper edge of said opening in lateral alignment with said axle for limiting lateral movement of said axle toward said opening, means on said axle defining a pair of vertical slots on opposed sides of said axle, and clip means engaged within said slots between said upper portion of said section and said tab on said web engageable with said section to limit lateral movement of said axle in a direction away from said tab.

4. In a conveyer assembly as defined in claim 3, means on said clip means for resiliently coupling said axle to said horizontal tab to resist upward movement of said axle out of said notch.

References Cited in the file of this patent

UNITED STATES PATENTS

| | | |
|---|---|---|
| 1,292,799 | Kendall | Jan. 28, 1919 |
| 1,837,480 | Philips | Dec. 22, 1931 |
| 2,103,106 | Yurkovitch | Dec. 21, 1937 |
| 2,391,272 | Rose | Dec. 18, 1945 |
| 2,483,345 | Lee | Sept. 27, 1949 |
| 2,827,153 | Olk et al. | Mar. 18, 1958 |
| 2,843,432 | Kindig | July 15, 1958 |